Aug. 19, 1958   J. J. SABATINI   2,847,857
ENGINE STARTER GEARING
Filed March 28, 1956
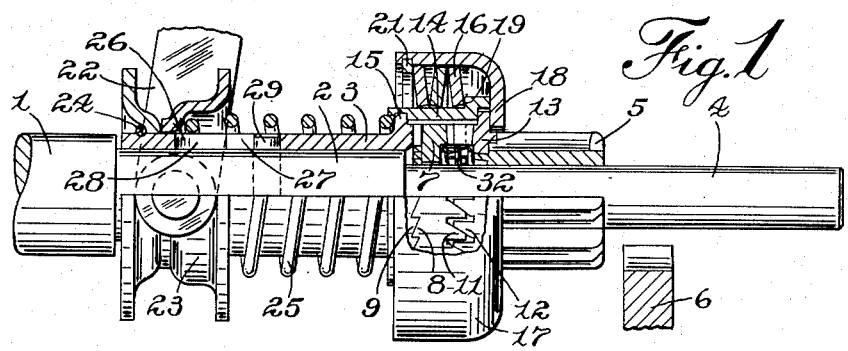
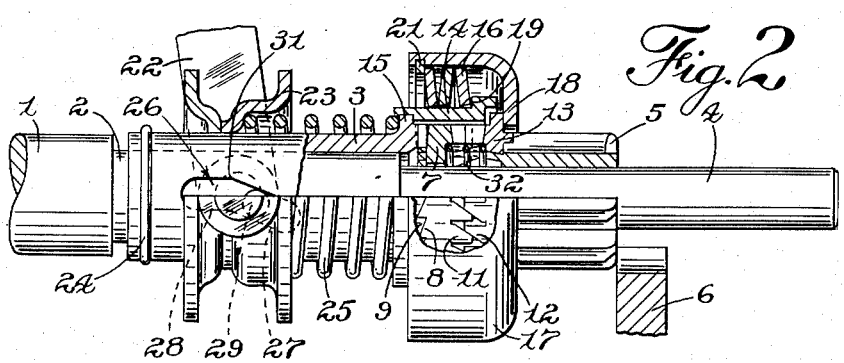
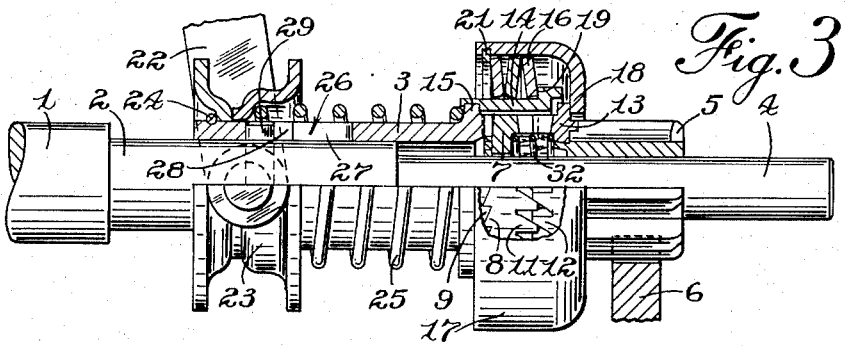
WITNESS:
INVENTOR.
John J. Sabatini
BY
ATTORNEY

United States Patent Office 2,847,857
Patented Aug. 19, 1958

2,847,857

ENGINE STARTER GEARING

John J. Sabatini, Horseheads, N. Y., assignor to Bendix Aviation Corporation, a corporation of Delaware Application March 28, 1956, Serial No. 574,511

4 Claims. (Cl. 74—6)

The present invention relates to engine starter gearing and more particularly to that type in which a motor driven pinion is shifted manually or electro-magnetically into and out of mesh with a gear of an engine to be started.

The present structure is in the nature of an improvement over the structure disclosed in the patent to Miller 2,593,167 issued April 15, 1952, and the application of Miller Ser. No. 511,828 filed May 31, 1955, both said patent and application being assigned to the assignee of the present application.

In the prior structures of Miller cited, a pinion is moved by a shifting fork into mesh with an engine gear, the shifting mechanism including a spring which is stressed in case of tooth abutment between the pinion and engine gear, and which snaps the pinion and its associated parts into meshing position when the pinion is indexed to relieve the tooth abutment. The pinion is rotated by a connection from a motor shaft including a transmission member indicated by numeral 9 in said Miller patent which has a dental overrunning clutch connection with the pinion and which is coupled to a driving sleeve indicated by numeral 3, by means of an overload slip coupling comprising inclined projections 7, 8.

It will be readily appreciated that since the transmission member 9 is capable of shuttling back and forth between the pinion and the driving sleeve, when the parts are snapped into meshing position after tooth abutment as above described, there will be a tendency for the transmission member 9 to lag behind, opening its clutch connection to the pinion whereby the restoration of such clutch connection upon initiation of the cranking operation may cause the device to be subjected to severe shock loads.

It is an object of the present invention to provide novel engine starter gearing of the above type including mesh-enforcing means and an overrunning clutch so arranged that operation of the mesh-enforcing means tends to maintain the overrunning clutch members in operative engagement and thereby prevent the imposition of shock loads on the gearing when the meshing operation is completed.

It is another object to provide such a device in which the noise attendant upon the operation of the dental coupling and clutch elements is confined and muffled so as to secure quiet operation of the device.

Further objects and advantages will be apparent from the following description taken in connection with the accompanying drawing in which:

Fig. 1 is a side elevation, partly broken away and in section, of a preferred embodiment of the invention showing the parts in idle position;

Fig. 2 is a similar view showing the parts in the positions assumed in case of tooth abutment between the starter pinion and engine gear; and Fig. 3 is a similiar view showing the parts in cranking position.

In Fig. 1 of the drawing there is illustrated a power shaft 1 which may be the extended armature shaft of a starting motor not illustrated. Shaft 1 has a smooth portion 2 of reduced diameter on which a shifting sleeve 3 is slidably journalled. Shaft 1 is also formed with a further reduced smooth portion 4 on which an actuating member in the form of a pinion 5 is slidably journalled for movement into and out of mesh with an engine gear 6.

Means for actuating the pinion 5 from sleeve 3 is provided comprising an intermediate annular transmission member 7 which is also slidably journalled on the reduced portion 4 of the shaft 1 and is provided with overrunning clutch teeth 8 adapted to cooperate with similar teeth 9 on the adjacent end of the sleeve 3. Transmission member 7 is also provided with inclined coupling projections 11 cooperating with similar projections 12 on a flange member 13 fixed in any suitable manner on the adjacent end of the pinion 5 to form in effect an integral part of the pinion member.

Means for maintaining a minimum separation of the sleeve 3 and pinion member 5 is provided in the form of a collar 14 having spacing abutments cooperating with a radial flange 15 on the sleeve 3 and with the flange 13 of the pinion member 5. Separation and slippage of the coupling between the transmission member 7 and pinion member 5 is yieldably resisted by a spring composed of dished elastic discs 16 enclosed within a barrel member 17 having an inturned flange 18 cooperating with the flange 13 and the adjacent end of the collar 14. The spring 16 is retained in the barrel under initial compression against a shoulder 19 on the collar 14 by means of a lock ring 21.

Means for shifting the sleeve 3 to move the assembly into and out of mesh is provided comprising a shifting fork 22 arranged to be operated manually or electro-magnetically, the tines of which engage in a channeled ring member 23 slidably journalled on the sleeve 3 and normally seated against a lock ring 24 by means of a compression spring 25 which bears against the flange 15 on the end of sleeve 3.

Sleeve 3 is formed with oppositely arranged slots 26 (Fig. 2) having spirally extending portions 27 and axially extending portions 28. A pin 29, fixed in any suitable manner as by a press fit in the shaft 1 extends through said slots to form a torque transmitting connection from the shaft 1 to the sleeve 3. The pin 29 is seated at the right hand end of the slot 26 as shown in Fig. 1 when the parts are in idle position, and traverses the helical portions of the slots upon initial meshing movement of the sleeve whereby rotation is imparted to the sleeve as it moves toward meshing position. The knuckles 31 of the slots are so located that the pin 29 enters the straight portions 28 of the slots shortly before the pinion 5 is fully meshed with the engine gear 6 as shown in Fig. 3.

The transmission member 7 is normally held in clutching engagement with the end of the sleeve 3 by means of a clutch spring 32.

In operation, starting with the parts in the positions illustrated in Fig. 1, movement of the shifting fork 22 to the right is transmitted through the ring 23 and spring 25 to the sleeve 3, and through the collar 14 to the pinion member 5 to move it toward meshing position.

If meshing takes place without obstruction, the relative positions of the shifting parts remain unchanged, and when the pinion is fully meshed with the engine gear as shown in Fig. 3, the starting motor is energized in the usual manner and rotation transmitted from the shaft 1 through the pin 29 to the sleeve 3, and by the overrunning clutch teeth 9, 8 to the transmission member 7. Cranking torque is then transmitted to the pinion 5, through the projections 11, 12 on the transmission member 7 and pinion member 5, the axial wedging action of these projections serving to force the overrunning clutch teeth 9, 8 together with a force limited by the compression of the spring 16 which allows the projections 11, 12 to slip past each other when a predetermined overload is exceeded.

In case, during the meshing operation, a tooth of the pinion member 5 abuts against a tooth of the engine gear 6 as shown in Fig. 2, the movement of the pinion is momentarily arrested and further movement of the shifting fork 22 causes the spring 25 to be compressed as there shown. When the fork 22 has thus completed its travel, the starting motor is energized in the usual manner to cause rotation of the shaft 1 which indexes the pinion member 5 to relieve the abutting condition. The spring 25 then expands and snaps the shifting members into meshed position.

It will be noted that during this mesh-enforcing movement, the inertia of the transmission member 7 assists the clutch spring 32 to hold the overrunning clutch teeth 9, 8 fully engaged. Consequently no lost motion can occur such as might permit the starting motor to rotate without load and thereby build up kinetic energy which would impose a shock load on the parts when the clutch became reengaged.

It will be noted that the shifting movement of the sleeve 3 is limited in both directions by the ends of the slots 26 in the sleeve so that the idle position of the parts as illustrated in Fig. 1 is defined by the seating of the pin 29 in the right hand end of the slots, and the meshed position of the parts as shown in Fig. 3 is defined by the seating of the pin 29 against the left hand end of the slots. The slots 26 are so located in the sleeve 3 that even in the meshed position as shown in Fig. 3, there is a closed section of the sleeve overlapping the end of the first reduced section 2 of the shaft as shown in Fig. 3. The chamber formed by the space between the sleeve and pinion member as enclosed by the collar 14 is thus sealed off to prevent access of foreign matter to the clutch and coupling elements, and to muffle the noise attendant upon the actuation of these elements in the cranking and overrunning operations of the starter gearing.

Although but one form of the operation has been shown and described in detail it will be understood that changes may be made in the design and arrangement of the parts without departing from the spirit of the invention.

I claim:

1. In starter gearing a power shaft, a sleeve slidably mounted thereon, means including a spring for traversing the sleeve on the power shaft, means transmitting rotation from the shaft to the sleeve, an actuating member slidably journalled on the power shaft for movement into and out of engagement with a member of the engine to be started, and means for driving the actuating member from the sleeve including a transmission member slidably journalled on the power shaft, having a dental overrunning clutch connection with the sleeve, said transmission member and actuating member having torque-transmitting interengaging projections so inclined that the transmission of torque thereby tends to wedge said members apart; and yielding means resisting the separation of said members; including further means for maintaining a minimum separation of the sleeve and the actuating member sufficient for the transmission member to move into and out of clutching engagement with said sleeve, and yielding means urging the transmission member away from the actuating member and into engagement with the sleeve.

2. Engine starter gearing as set forth in claim 1, in which the means for transmitting rotation from the power shaft to the sleeve includes a pin fixedly mounted in the shaft, said sleeve having a slot slidably receiving the pin and limiting the longitudinal movement of the sleeve on said shaft.

3. Engine starter gearing as set forth in claim 2 in which the means for traversing the sleeve on the power shaft includes a shift collar slidably mounted on the sleeve, and a spring transmitting longitudinal movement of the collar to the sleeve in the direction to cause the actuating member to engage the engine member; said slot having a helically arranged portion so formed that rotation of the pin by the power shaft tends to cam the sleeve in the direction to cause the actuating member to engage the engine member.

4. In starter gearing for internal combustion engines a power shaft, a sleeve slidably journalled on the power shaft having an axially extending slot, a pin in the power shaft traversing said slot, said shaft having a smooth reduced portion extending beyond the sleeve, an actuating member slidably journalled on said reduced portion for movement into and out of engagement with a member of the engine to be started, means for shifting the sleeve axially on the shaft, means including a transmission member having a dental over-running clutch connection with the sleeve for driving the actuating member from the sleeve; said slot cooperating with the pin to limit the axial movement of the sleeve and thereby prevent the slot from overlapping and exposing the reduced portion of the shaft; means for maintaining a minimum separation of the sleeve and the actuating member sufficient for the transmission member to move into and out of clutching engagement with said sleeve, and yielding means urging the transmission member away from the actuating member and into engagement with the sleeve.

References Cited in the file of this patent
UNITED STATES PATENTS 1,995,765     Carle _____ Mar. 26, 1935
2,593,167     Miller _____ Apr. 15, 1952